United States Patent [19]

LeFebvre et al.

[11] Patent Number: 5,612,882
[45] Date of Patent: Mar. 18, 1997

[54] METHOD AND APPARATUS FOR PROVIDING NAVIGATION GUIDANCE

[76] Inventors: Rebecca K. LeFebvre, 130 Toulon Dr., Buffalo Grove, Ill. 60089; Patrick M. Ryan, 404 Concord La., North Barrington, Ill. 60010; Joseph W. Seda, 924 Valley Stream Dr., Wheeling, Ill. 60090; Leslie G. Seymour, 861 Shoreline Rd., Barrington, Ill. 60010; Yilin Zhao, 2742 Wilshire La., Northbrook, Ill. 60062

[21] Appl. No.: 384,071

[22] Filed: Feb. 1, 1995

[51] Int. Cl.⁶ .................................................. G06F 165/00
[52] U.S. Cl. ...................... 364/449.3; 390/990; 390/995
[58] Field of Search ..................................... 364/443, 444, 364/449, 461; 73/178 R; 340/988, 990, 995

[56] References Cited

U.S. PATENT DOCUMENTS

| | | | |
|---|---|---|---|
| 5,177,685 | 1/1993 | Davis et al. | 364/443 |
| 5,315,295 | 5/1994 | Fujii | 340/995 |
| 5,357,438 | 10/1994 | Davidian | 364/461 |
| 5,369,588 | 11/1994 | Hayami et al. | 364/449 |
| 5,444,629 | 8/1995 | Kishi et al. | 340/995 |
| 5,452,217 | 9/1995 | Kishi et al. | 340/995 |
| 5,465,089 | 11/1995 | Nakatani et al. | 340/995 |

*Primary Examiner*—Gary Chin
*Attorney, Agent, or Firm*—Michael L. Smith

[57] ABSTRACT

A method and apparatus (10) for providing navigation guidance via a land vehicle by providing a navigation route planner (24) having a road network database (12) for planning a navigation route along the road network, determining a current estimated position of the land vehicle, communicating maneuver instructions to a driver of the land vehicle at a predetermined maneuver distance base value before the land vehicle reaches a required maneuver along the planned navigation route, and detecting and quantifying current environmental travel conditions for assisting a navigation device in guiding the land vehicle along the planned navigation route.

16 Claims, 6 Drawing Sheets

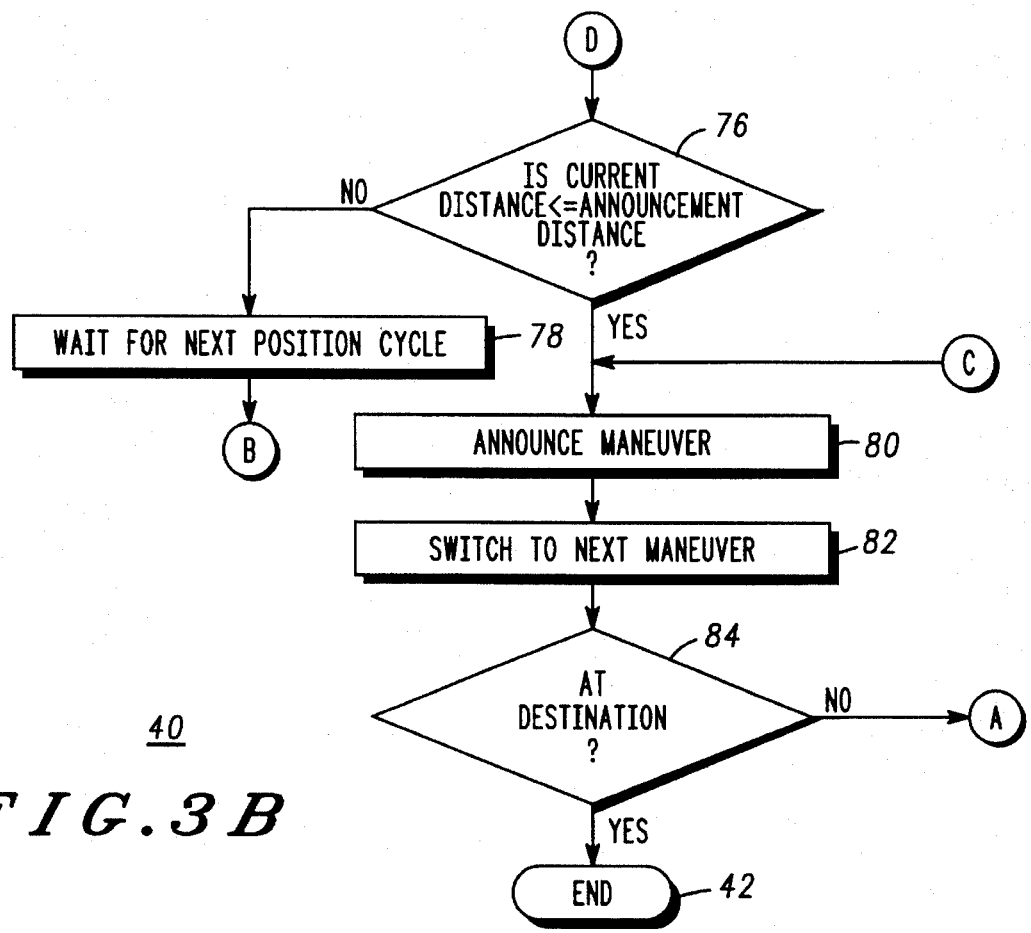

METHOD AND APPARATUS FOR PROVIDING NAVIGATION GUIDANCE

FIELD OF THE INVENTION

The present invention relates to methods and apparatus for providing navigation guidance in a land vehicle. More specifically, the present invention relates to navigation devices for a land vehicle that provide the user with route planning and maneuver instructions along the planned navigation route.

BACKGROUND OF THE INVENTION

Prior art systems for vehicle route guidance have used vehicle speed, the distance to a required maneuver, the angle of the connected road segment (the difficulty of the turn), assumed models of vehicle performance, and various driver preference factors for use in providing a user with route guidance, such as maneuver instruction timing.

At least one prior art system, Davis et al. U.S. Pat. No. 5,177,685, suggests taking into account the type of road in order to estimate the distance required to decelerate and provide the driver with an instruction to slow down enough in order to perform the required maneuver in a safe unhurried manner. This apparently is accomplished by modeling the vehicle performance and estimating a coefficient of friction of the road by comparing the applied braking force with the resulting deceleration (see col. 21, lines 64-8). However, this only provides a very rough estimate of a road condition which may or may not be an accurate representation of the actual environmental travel conditions that exist.

Prior art systems require the use of physical vehicle characteristics in estimating the amount of time or distance that a vehicle requires to perform a maneuver. This use of vehicle performance characteristics may vary greatly from vehicle to vehicle. Therefore, prior art systems do not allow for easy installation from one vehicle to another and may, in fact, require recalibration because a vehicle's performance changes over time.

To this point the prior art has disregarded important factors related to the environmental travel conditions that may exist for a user when providing route planning and route guidance. Therefore, it would be desirable to provide a system wherein the route planning and guidance that is performed takes into account and is adjusted for current environmental travel conditions such as the time of day, the amount of precipitation falling, the temperature, and other environmental conditions that may affect a user's travel along a given route. By detecting and quantifying factors, such as those listed above, a navigation system can be implemented that is independent of a vehicle's performance characteristics but still compensates for changing environmental travel conditions. In addition, these type of environmental factors could be used to override normal factors because ignoring severe weather conditions could render maneuver instructions useless or even dangerous.

BRIEF DESCRIPTION OF THE DRAWINGS

For a more complete understanding of the invention, reference should be made to the drawings in which:

FIGS. 3A and 3B are another flowchart in accordance with the present invention;

FIG. 5 is a graphic illustration of certain environmental travel conditions of FIG. 4;

DETAILED DESCRIPTION OF THE PREFERRED EMBODIMENT

A method and apparatus for providing navigation guidance in a land vehicle is provided. This includes a navigation route planner having a road network database for planning a navigation route along the road network. Maneuver instructions are communicated to a driver of the land vehicle thereby providing route guidance along the planned route. In addition, an estimated current position of the land vehicle is determined in order to provide the maneuver instructions in a timely manner. Also, current environmental travel conditions are detected and quantified for assisting the navigation apparatus in guiding the land vehicle along the planned navigation route.

Figure 1:
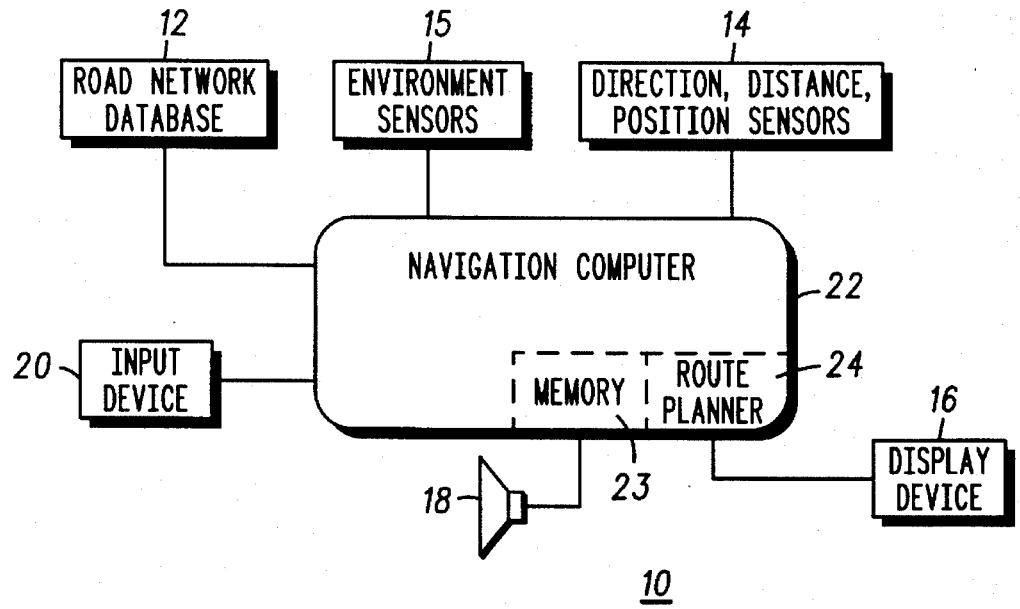
FIG. 1 is a schematic diagram of a land vehicle navigation apparatus in accordance with the present invention.

A land vehicle navigation apparatus 10, in accordance with the present invention, is shown in FIG. 1. The land vehicle navigation apparatus 10 preferably includes a road network database 12, direction and distance sensors 14, environmental sensors 15, a display device 16, an audio output source 18, an input device 20, and a navigation computer 22 operably connected as shown. In addition, the navigation computer 22 includes a memory 23 and a route planner 24 for planning navigation routes along the road network database 12, according to inputs made by the user through input device 20. The computer 22 preferably includes a microprocessor or other similar type of computer. The road network database can be stored on a compact disk which is loaded into navigation computer 22 for particular geographical areas, or the data can be received dynamically as the vehicle travels into different geographical areas via communications sources such as a cellular phone.

The sensors 14 provide conventional vehicle direction information through the use of such sensors as a compass, gyroscope, and a differential odometer. Such direction sensors are well known and used in prior navigation systems either alone or in combination. The sensors 14 may also include conventional wheel travel distance sensors and position determining devices or sensors such as global positioning system (GPS) receivers which provide precise vehicle position location information. If GPS position sensors are not used then the navigation computer 22 may use dead reckoning navigation computations based on distance travel and vehicle direction. The implementation of dead reckoning position computations by navigation systems is very well known.

The environmental sensors 15 preferably include sensors for detecting environmental information including: the ambient or outside temperature, the speed of windshield wiper movement, the time of day, the amount of light available to the driver, the humidity, a ratio of the land vehicle speed to a reference speed for the road (representing a congestion level of traffic), and sensors for detecting the distance between the land vehicle and an immediately preceding or trailing vehicle. By detecting these current environmental travel conditions with sensors 15 and then quantifying them in the navigation computer 22 an estimate can be made of the current travel conditions which may affect the ability of the driver to travel along a given navigation route. Depending on the estimated current environmental travel conditions, factors such as maneuver instruction timing can be adjusted. For example, the user may be provided with a maneuver instruction at an earlier time, if the road conditions are hazardous, as explained in detail below.

These maneuver instructions are provided by the navigation computer 22 through a maneuver instruction communication device, such as the display device 16, the audio output source 18, or both.

Figure 2:
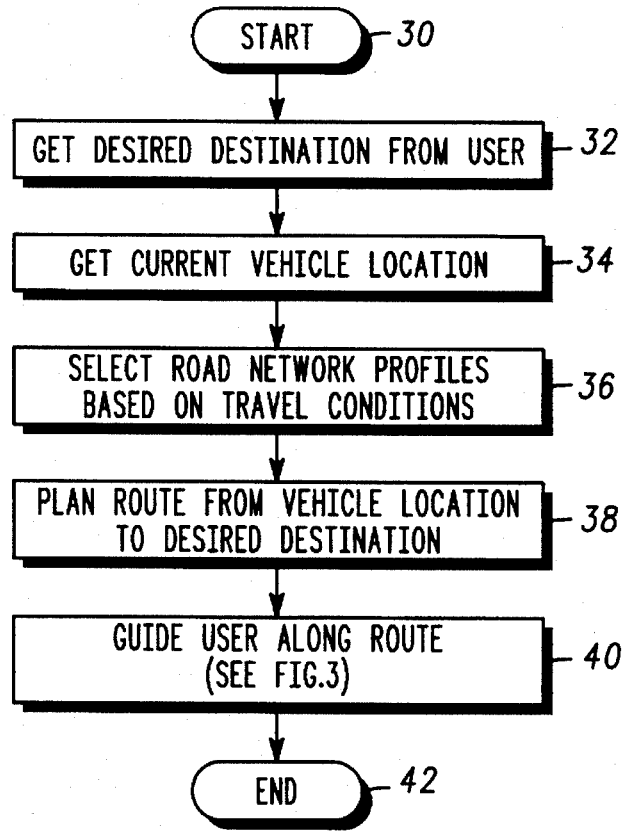
FIG. 2 is a flowchart in accordance with the present invention.

FIG. 2 sets forth an overview of the function of the navigation apparatus 10, in accordance with the present invention. The planning and guidance of the land vehicle begins at block 30. Block 32 then gets the desired destination of a route from the user through input device 20. Next, block 34 causes the navigation computer 22 to obtain the current land vehicle location via position sensors 14.

Block 36 causes navigation computer 22 to select road network profiles from the database 12, based on travel conditions. The network profile selection can be, for example, one of two possibilities—normal or weather. The database 12 preferably contains two sets of road network profiles, one set for normal conditions and one set for weather conditions. Determining the proper profile to be used in planning the navigation route can be as simple as detecting movement of a vehicle's wiper blade. If the wiper blade is moving then the profile to be used is the weather profile; otherwise the profile used is the normal profile.

As those skilled in the art will appreciate, detecting wiper blade movement for use in route planning will be most effective for routes within a relatively small geographical area, i.e. an area in which the weather will likely be similar at the origin and destination. For planning longer routes receiving and detecting some sort of broadcast weather data would be preferable.

It is also noted that more sophisticated weather profiles could be established for varying types of weather if additional factors such as temperature and time of day are detected and quantified. For example, a low lying road may flood during rain but be unaffected by snow. Therefore, the profile or cost associated with the low lying road might be increased for rainy weather but remain the same or normal for clear and snowy conditions. Once the proper road network profile is chosen the route planning is performed at block 38.

Block 38 causes the route planner 24 to plan a navigation route from the current land vehicle location, obtained at block 34 to the desired destination obtained at block 32. This planning is done in any conventional manner well known in the art. Block 40 then causes the navigation apparatus 10 to guide the user or driver along the route planned at block 38, as described in detail in FIG. 3.

Figure 3A:
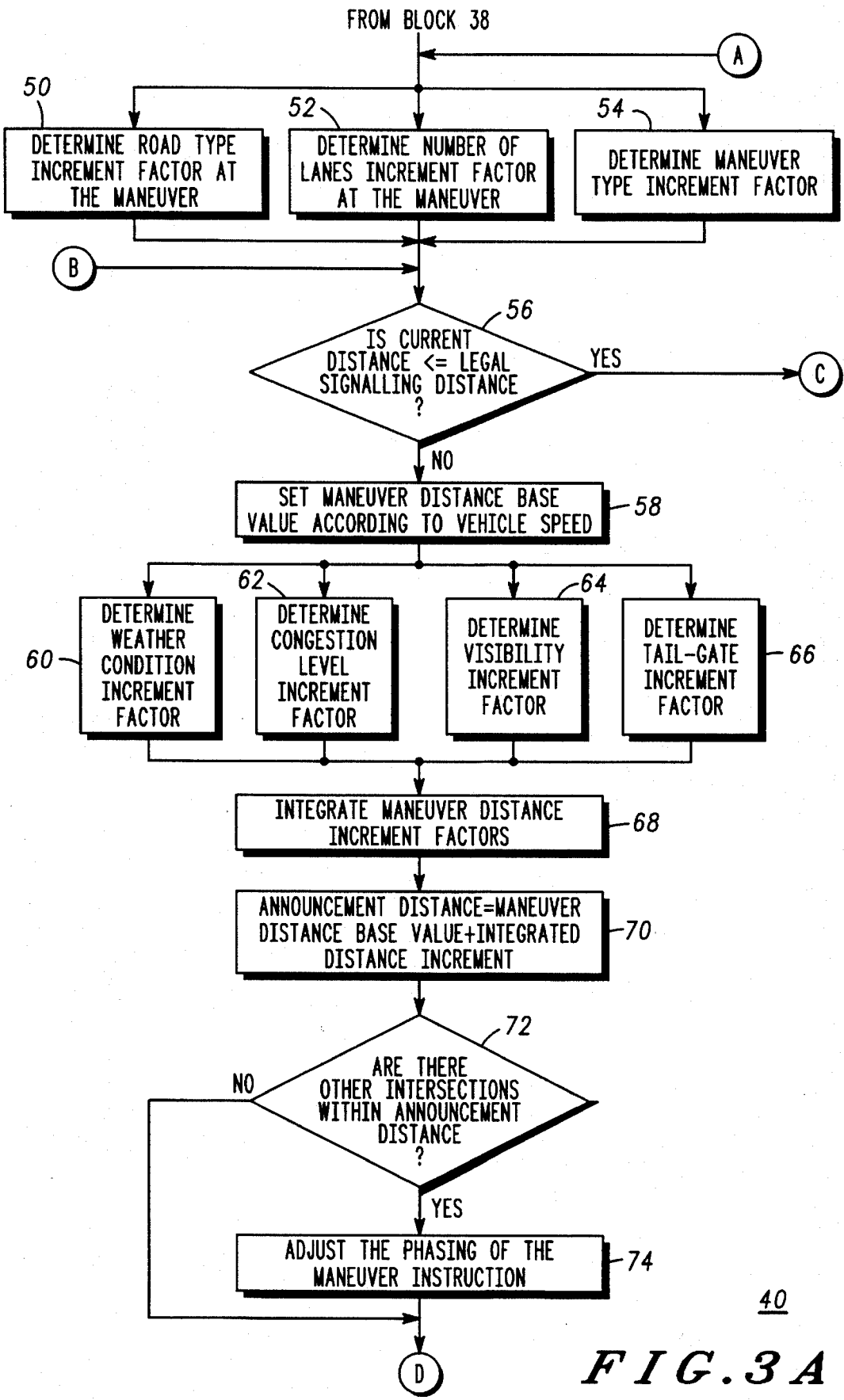

FIG. 3 is a flow chart illustrating block 40 in detail. After block 38 blocks 50, 52, and 54 are performed by the navigation computer 22 obtaining data defining the road segments preceding the maneuver points of the planned route from the database 12. Block 50 determines the road type at a point where the next route maneuver (e.g., a turn onto another road) will occur, and computer 22 then designates an increment factor corresponding to the road type at the next maneuver.

The increment factor is a weighting that will affect when a maneuver instruction is given to a user. Some examples of road types include highways, expressways, and residential roads. The highway road type requires a higher increment factor than the residential road type because on busy highways before major intersections there are usually more distractions to concentrate on than on residential streets. On long, fast roads (expressways and highways) it is also more likely that a driver's response to maneuver instructions will be slower due to the more monotonous ride. Other factors such as vehicle speed and traffic congestion are factored in separately. The higher the increment factor given to a particular road type the sooner, i.e. the further from the maneuver, the maneuver instruction will be given to the driver.

Block 52 determines the number of lanes of the road at the maneuver and designates a corresponding increment factor. For example, the increment factor will be greater for a four-lane interstate highway than for a one-lane residential street. This is because the driver on the interstate will be traveling at a greater speed and may need to merge across several lanes of traffic to perform the next maneuver; whereas the driver on the residential street will be traveling relatively slowly and will simply need to make a required maneuver from the lane in which he is presently traveling. Therefore, the driver on the interstate will require more advanced warning than the driver on the residential street.

The maneuver type is then determined at block 54. The maneuver type increment factor is affected by the difficulty of the next maneuver or perhaps a series of maneuvers. For example, if the next maneuver requires the driver to make a turn of more than the normal ninety degrees then this instruction should be given earlier than normal to give the driver some extra time to adjust to the unusual maneuver. Other maneuver types include making exits from traffic circles and starting compound maneuvers that require multiple turns in a short distance.

The difficulty of performing the maneuver primarily depends on the angle of the intersecting roads at the maneuver point. Table 1 sets forth exemplary difficulty factors based on the angle at the maneuver.

TABLE 1

| Angle at Maneuver | Difficulty Factor (Singular) | Difficulty Factor (Compound) |
|---|---|---|
| <45° | 1.7 | 1.8 |
| >45° <70° | 1.3 | 1.5 |
| >70° <110° | 1.0 | 1.3 |
| >110° <135° | 0.8 | 1.2 |
| >135° | 0.7 | 1.1 |

The difficulty factor is used to determine the maneuver distance increment due to the maneuver type difficulty, which can be expressed as:

Distance Increment=(Distance Base Value*Difficulty Factor)—Distance Base Value, where the Distance Base Value is determined according to vehicle speed by any well known method.

As seen in Table 1, there are two different difficulty factors given. This is because the difficulty of comprehending the maneuver instructions will change with the maneuver type. Compound maneuvers (those involving closely spaced turns) require a longer time to comprehend, hence the difficulty factor is larger than for the singular maneuvers. An example of a singular maneuver is "Turn right onto Main Street" and a typical compound maneuver is "Turn right onto Main Street, then immediately take a second right onto Oakwood Drive".

The factors in Table 1 can be further optimized by performing a human factors analysis. As those skilled in the art know, to use a human factors analysis several drivers are presented with maneuver instructions that cover all 10 categories in Table 1. The drivers should provide an appropriate sampling of the potential users of the system 10. The drivers then rate how convenient the maneuver timing was for each maneuver, i.e. adequate, too early, or too late. Based on the drivers's responses the difficulty factors are then adjusted and the test repeated until a predetermined majority of the drivers rate the timing as adequate. Similar tuning methods based on human preferences are known in the field of statistics, fuzzy membership function calibrations, and neural networks. As those skilled in the art will appreciate, the use of this method to tune factors can be extended to other factors of maneuver execution disclosed in the instant invention.

Decision block 56 then determines if the distance from the current vehicle location to the next maneuver is equal-to-or-less-than the legal signaling distance. If the answer to block 56 is yes the maneuver is announced to the user through at least one of the display device 16 and the audio source 18. If the answer is no, block 58 sets a maneuver instruction base distance value, according to the vehicle speed. Obviously, the faster the vehicle is traveling the greater the distance prior to the required maneuver that will be necessary to provide the instruction to the driver in a safe, timely, and orderly fashion. The base distance value needs to be set to a distance that allows the driver to become aware of the instruction, make the proper signals to other drivers, and prepare the vehicle to make the maneuver by changing lanes, slowing down, etc.

Blocks 60, 62, 64, and 66 then detect and quantify current environmental travel conditions that may affect the timing or content of the maneuver instructions to be given. Block 60 determines the weather conditions and a corresponding increment factor. The weather conditions include detecting, if any, the type and severity of current precipitation, e.g. rain or snow. The existence of precipitation is preferably determined by detecting the movement of the vehicle's windshield wipers with a sensor 15. If the wipers are moving it is assumed that precipitation is falling and the amount of precipitation (low, medium, or high) is assumed from the speed setting of the wipers. The faster the wiper speed the heavier the precipitation.

Finally, an estimate of the type of precipitation is made based on the outside temperature. This is explained in detail below in connection with FIGS. 7–10 and Table 3. This is an important factor to be considered in route guidance because the more severe the weather the earlier a driver needs to know what maneuver will be required. Obviously, this is because if the roads are snow or ice covered a driver requires more time to slow down to make a turn; its well as the fact that visibility may be impaired. As those skilled in the art will appreciate, methods other than using windshield wiper movement as an indication of the existence of precipitation may be used with the present invention. For instance, a humidity sensor could be used or some type of electronic weather service signal might be received and used.

A determination of the current congestion level of traffic on the road currently being traveled is made at block 62 by any well known means, including extracting the congestion level from traffic information broadcasts. Loop-detectors and roadside beacons could also be used to convey congestion data to a vehicle. The higher the congestion level the more likely a vehicle must maneuver to get into position to initiate a turn. It is also likely to take longer for a driver to get into position since the driver will most likely be distracted and impaired by other surrounding vehicles.

Block 64 detects and quantifies a visibility increment factor by sensing the amount of light and the time of day. The amount of light can be detected with a photoelectric sensor or the like. The visibility increment factor is increased as the amount of detected light decreases because a driver will desire maneuver instructions earlier at night than during the day. A separate visibility factor in addition to the weather condition is preferably included because the weather condition might be derived from broadcast data rather than vehicle sensors. In such a case it would be preferable to derive a visibility factor based on actual visibility rather than on anticipated visibility from the broadcast data.

Block 66 then detects and quantifies a tail-gate increment factor that is based on the distance between the vehicle and an immediately preceding or trailing vehicle. The distance between the vehicles is determined by a device such as radar, sensors using stereo vision, or a laser range finder. The closer other vehicles are ahead of and behind a driver, the more the driver must concentrate on monitoring their motion This increased monitoring of other vehicles slows the driver's ability to make plans and decisions on maneuvers. For example, if the adjacent (target) lane is occupied next to the driver, he may have less room to maneuver to get ahead of or behind the vehicle blocking his way. The driver may not be able to accelerate or slow down at the desired rate. Also, to be safe the driver needs to signal the turn and related lane change and brake slowly while making sure the trailing vehicle noticed the intended move. Therefore, as the distance between the vehicles decreases the tail-gate increment factor is increased.

Next, block 68 integrates the maneuver distance increment factors of blocks 50, 52, 54, 60, 62, 64, and 66 to form an integrated distance increment factor. As those skilled in the art will appreciate, the integration of these factors is not necessarily a linear function. For example, if it is currently raining heavily the visibility factor may be less important. This is because a function of heavy rain is decreased visibility and therefore there may be no need to further add the visibility factor to the announcement distance. An example of an integration in accordance with block 68 is described below in detail with respect to FIGS. 4–10 and Tables 2–4.

The announcement distance is then set at block 70 as the sum of the maneuver distance base value of block 58 and the integrated distance increment of block 68.

Block 72 then determines if there are other intersections between the required maneuver and the announcement distance. If there are other intersections, block 74 causes the phrasing or content of the maneuver instruction to be adjusted so that the driver is made aware to prepare for a maneuver but that there are intervening intersections. This is important so that the driver does not become confused and make a premature turn. As those skilled in the art will appreciate, the decision block 72 is but one example of travel conditions that may exist where the maneuver instruction phrasing should be adjusted. Another example would be to tell the driver to slow down for an approaching maneuver because the temperature is around freezing and the roads may be slick and dangerous.

After block 74 or if the decision at block 72 is no, decision block 76 determines if the current distance between the vehicle and the next maneuver is equal-to-or-less-than the announcement distance of block 70. If no, block 78 waits for the next position cycle and loops back to decision block 56.

If the decision at block 76 is yes, block 80 causes the maneuver to be announced. Block 82 then causes the navigation apparatus to switch to the next maneuver. Finally, decision block 84 determines if the vehicle has reached the desired destination of block 32. If the destination has been reached then block 42 ends the route guidance. If the block 84 decision is no, then there is a loop back to blocks 50, 52, and 54 to begin guidance for the next maneuver.

Figure 4:
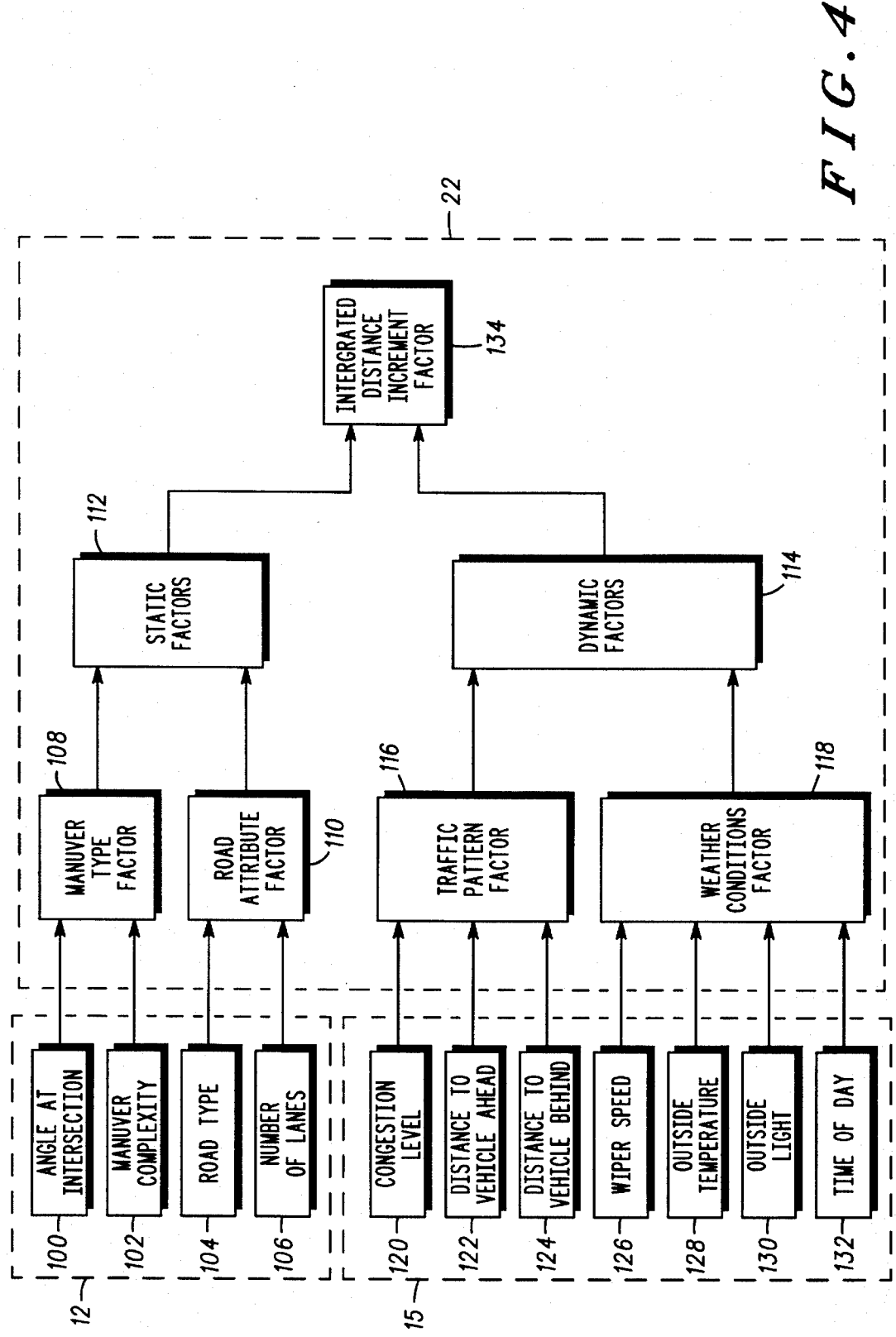
FIG. 4 is a block diagram illustrating a method of detecting and quantifying current environmental travel conditions in accordance with the present invention.

FIG. 4 is a block diagram illustrating the sequence of how the increment factors of blocks 50, 52, 54, 60, 62, 64, and 66 are integrated by certain portions of road network database 12, sensors 15, and computer 22. Factors such as the angle of the required maneuvers at the intersections, the maneuver complexity, road types, and the number of lanes are contained in the database 12, as indicated in boxes 100, 102, 104, and 106, respectively. The boxes 100 and 102 combine to form a maneuver type factor 108 that quantifies a maneuver's difficulty and corresponds to block 54 of FIG. 3. The boxes 104 and 106 (corresponding to blocks 50 and 52, respectively) combine to form a road attribute factor 110 that quantifies adjustments in maneuver timing based on the road type. The factors 108 and 110 combine to form so called static factors 112. Factors 112 are labeled as static because these increment factors can be identified as soon as the route is planned and they will not change. The maneuver type factor 108 is determined by reference to look-up Table 1, which may be contained in memory 23 of computer 22. Similarly, the road attribute factor 110 is determined by reference to Table 2.

In contrast, sensors 15 are used to detect dynamic factors 114. The dynamic factors 114 are obtained from a traffic pattern factor 116 and a weather conditions factor 118. The traffic pattern factor 116, corresponding to blocks 62 and 66 of FIG. 3, is formed by detecting traffic conditions such as a congestion level 120, a distance to a vehicle ahead 122, and a distance to a vehicle behind 124. The congestion level can be detected in several ways, for example, by receiving broadcast data or by estimating the level based on current vehicle speed relative to the speed limit. A wiper speed 126, an outside temperature 128, an amount of outside light 130, and, optionally, a time of day 132 (not used in Table 3) are sensed and combined to form the weather conditions factor 118, which corresponds to blocks 60 and 64 of FIG. 3. The factors 116 and 118 are termed dynamic because they can change even while approaching the maneuver point. The static factors 112 and dynamic factors 114 combine to form an integrated distance increment factor 134. It is noted that the dynamic factor 114 is preferably updated for each position cycle, as shown in FIG. 3, to allow for optimal adjustment of the maneuver distance base value.

Figure 6:
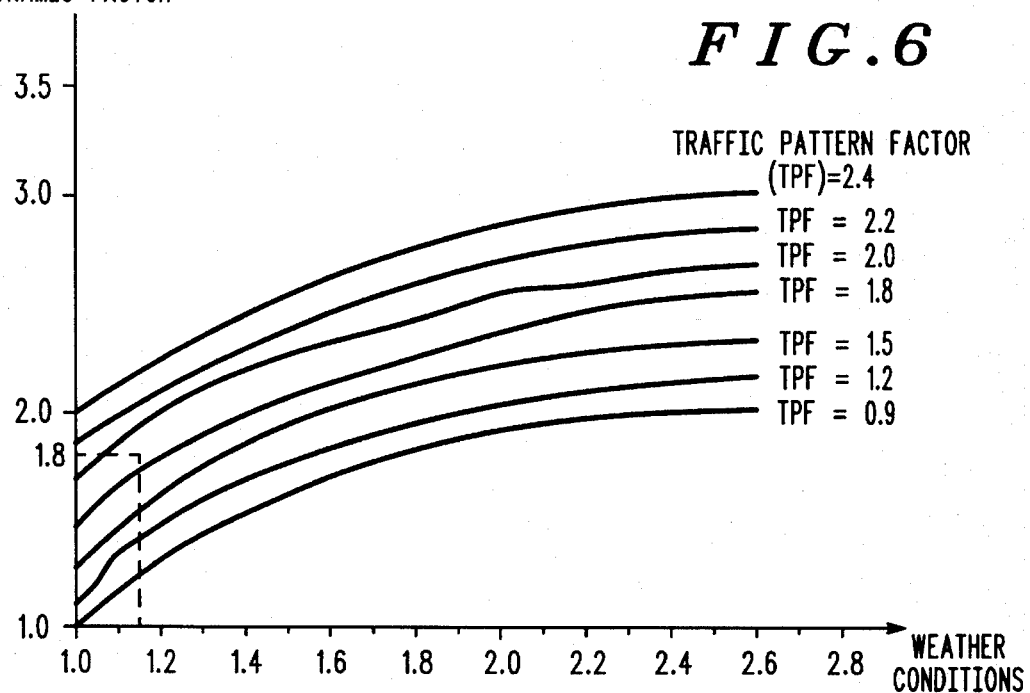
FIG. 6 is a graphic illustration of other environmental travel conditions of FIG. 4.

The graphs of FIGS. 5 and 6 illustrate typical static and dynamic factors, respectively. The static factors 112 are shown in FIG. 5 over a range of maneuver type factors 108 and road attribute factors 110. Similarly, the dynamic factors 114 are shown in FIG. 6 for a range of traffic pattern factors 116 and weather conditions factors 118.

The following is an example of a calculation of an integrated distance increment factor 134 (IDIF). The IDIF can be set forth as $$IDIF=k*[(W_s*SF)+(W_d*DF)],$$

where k is a constant, $W_s$ is a static weight, $W_d$ is a dynamic weight, and SF and DF are the static and dynamic factors 112 and 114, respectively. The data as determined and sensed by the system 10 is given as:

k=1.2

$W_s$=0.4

$W_d$=0.6

Vehicle Speed=35 mph

Maneuver Angle=72°

Maneuver Instruction=Singular

Road Type=Highway

No. of Lanes=4

Congestion Level=1.3

Distance to Vehicle Ahead=3.2 vehicle lengths

Distance to Vehicle Behind=1.4 vehicle lengths

Wiper Speed=low

Temperature=above freezing

Outside Light=high

Referring to Table 1 and given the maneuver angle and maneuver instruction type, it can be seen that the Maneuver Type Factor is 1.0. The Road Attribute Factor can be seen to be 1.4 in look-up Table 2 based on the present example. Once the Maneuver Type and Road Attribute Factors have been determined reference can be made to FIG. 5 to determine the Static Factor, SF. The Static Factor can be seen to be approximately 1.22 for this example.

Similarly, the Dynamic Factor is determined by reference to Tables 3 and 4. From the given parameters of the example above it can be determined that the Weather Conditions Factor is F1, which for this example is 1.15, as explained below. Taken from Table 4, the Traffic Pattern Factor is 1.9. Then, by interpolating between the given Traffic Pattern Factor curves for the values 1.8 and 2.0, it can be determined that the Dynamic Factor for the present example is approximately 1.8, as shown by the dashed lines in FIG. 6.

Now the IDIF can be determined as:

$$IDIF=1.2*[(0.4*1.22)+(0.6*1.8)]=1.88.$$

The IDIF is then multiplied by a distance base value to determine when the maneuver instruction should be presented to the user. As those skilled in the art will appreciate, the FIGS. 5 and 6 and Tables 1–4 can be entered into a memory of computer 22 in order to provide optimal maneuver instruction timing for the ever changing environmental travel conditions encountered by the system's users.

Figure 7:
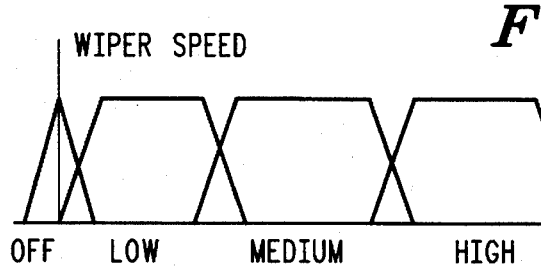
FIG. 7 is a graphic illustration of a membership function for windshield wiper blade speed in accordance with the present invention.
Figure 8:
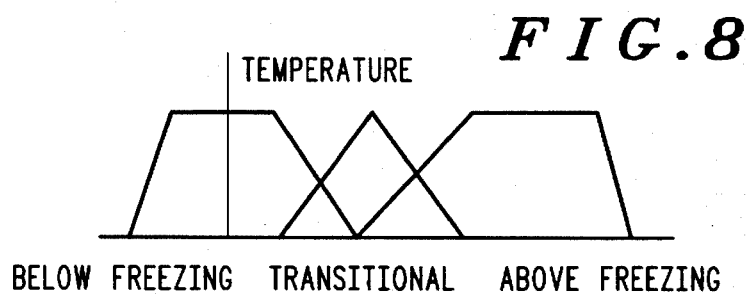
FIG. 8 is a graphic illustration of an input membership function for temperature in accordance with the present invention.
Figure 9:
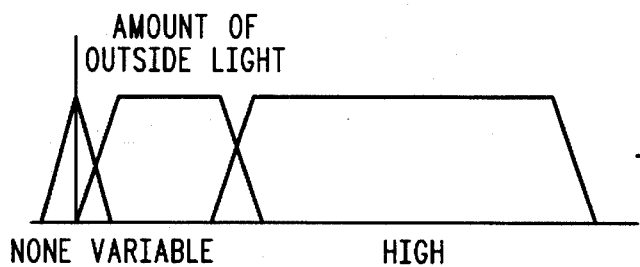
FIG. 9 is a graphic illustration of an input membership function for the amount of ambient light in accordance with the present invention.
Figure 10:
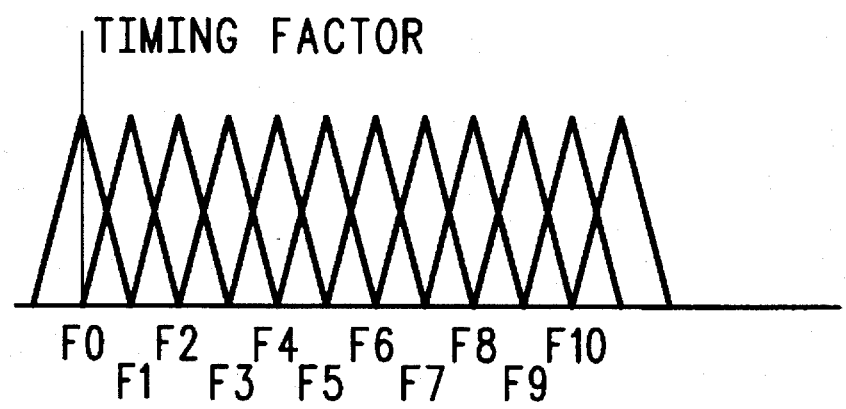
FIG. 10 is an output membership function illustrating maneuver timing instruction factors in accordance with the present invention.

FIGS. 7–9 are typical fuzzy sets for input membership functions for windshield wiper speed, temperature, and amount of natural light, respectively. These three inputs, corresponding to blocks 60 and 64 of FIG. 3 and block 118 of FIG. 4, are then combined together using a set of fuzzy rules to determine the severity of the weather conditions that in turn determine the weather conditions factor, also referred to in Table 3 as the timing factor. In FIG. 10 the timing factors F0–F10 represent progressively more severe weather, which requires that the maneuver instructions be given to the driver at progressively earlier times, or in other words, the announcement distance shall become larger. A typical set of values for the factors F0–F10 for use with the present example might be:

F0 = 1.0
F1 = 1.15
F2 = 1.3
F3 = 1.45
F4 = 1.6
F5 = 1.75
F6 = 1.9
F7 = 2.05
F8 = 2.3
F9 = 2.45
F10 = 2.6

TABLE 2

| No. of Lanes | Road Type | Road Attribute Factor |
| --- | --- | --- |
| 2 | Residential (R) | 1.0 |
| 2 | Highway (Hwy) | 1.2 |
| 2 | Expressway (Ewy) | 1.0 |
| 4 | R | 1.2 |
| 4 | Hwy | 1.4 |
| 4 | Ewy | 1.4 |
| 6 | R | 1.4 |
| 6 | Hwy | 1.6 |
| 6 | Ewy | 1.6 |
| >6 | R | 1.8 |
| >6 | Hwy | 2.0 |
| >6 | Ewy | 2.0 |

TABLE 3

| Case No | Wiper Speed | Temperature | Outside Light | Weather | Timing Factor |
| --- | --- | --- | --- | --- | --- |
| 1 | off | — | none | dry, night | F1 |
| 2 | off | — | variable | dry, dusk/dawn | F1 |
| 3 | off | — | high | dry, day | F0 |
| 4 | low | below freezing | none | light, night-time snow | F3 |
| 5 | low | transitional | none | light, night sleet, possible ice | F3 |
| 6 | low | above freezing | none | light, night-time rain | F2 |
| 7 | low | below freezing | variable | light, disk/dawn snow | F3 |
| 8 | low | transitional | variable | light, dusk/dawn sleet, possible ice | F4 |
| 9 | low | above freezing | variable | light, dusk/dawn rain | F2 |
| 10 | low | below freeing | high | light, day-time snow | F2 |
| 11 | low | transitional | high | light daytime sleet, possible ice | F3 |
| 12 | low | above freezing | high | light, daytime rain | F1 |
| 13 | medium | below freezing | none | medium night-time snow | F6 |
| 14 | medium | transitional | none | medium night-time sleet, possible ice | F6 |
| 15 | medium | above freezing | none | medium night-time rain | F4 |
| 16 | medium | below freezing | variable | medium dusk/dawn snow | F4 |
| 17 | medium | transitional | variable | medium dusk/dawn sleet, possible ice | F5 |
| 18 | medium | above freezing | variable | medium dusk/dawn rain | F3 |
| 19 | medium | below freezing | high | medium daytime snow | F4 |
| 20 | medium | transitional | high | medium daytime sleet, possible ice | F5 |
| 21 | medium | above freezing | high | medium daytime rain | F3 |
| 22 | high | below freezing | none | heavy night-time snow | F10 |
| 23 | high | transitional | none | heavy nigh-time sleet, possible ice | F8 |
| 24 | high | above freezing | none | heavy night-time rain | F7 |
| 25 | high | below freezing | variable | heavy dusk/dawn snow | F8 |
| 26 | high | transitional | variable | heavy dusk/dawn sleet, possible ice | F8 |
| 27 | high | above freezing | variable | heavy dusk/dawn rain | F6 |
| 28 | high | below freezing | high | heavy day-time snow | F7 |

TABLE 3-continued

| Case No | Wiper Speed | Temperature | Outside Light | Weather | Timing Factor |
|---|---|---|---|---|---|
| 29 | high | transitional | high | heavy daytime sleet, possible ice | F8 |
| 30 | high | above freezing | high | heavy daytime rain | F6 |

TABLE 4

| Congestion Level (X*Avg. travel time) | Distance to Vehicle Ahead (in auto lengths) | Distance to Vehicle Behind (in auto lengths) | Traffic Pattern Factor |
|---|---|---|---|
| <1 | >3 | >3 | 0.9 |
| 1 | <1.5 | <1.5 | 2.0 |
| 1 | <1.5 | — | 1.8 |
| 1 | — | <1.5 | 1.8 |
| 1 | >3 | >3 | 1.0 |
| 1 | 1.5–3 | 1.5–3 | 1.5 |
| 1 | >3 | 1.5–3 | 1.2 |
| 1 | 1.5–3 | >3 | 1.2 |
| 1–1.5 | <1.5 | <1.5 | 2.1 |
| 1–1.5 | <1.5 | — | 1.9 |
| 1–1.5 | — | <1.5 | 1.9 |
| 1–1.5 | >3 | >3 | 1.1 |
| 1–1.5 | 1.5–3 | 1.5–3 | 1.6 |
| 1–1.5 | >3 | 1.5–3 | 1.3 |
| 1–1.5 | 1.5–3 | >3 | 1.3 |
| 1.5–2 | <1.5 | <1.5 | 2.2 |
| 1.5–2 | <1.5 | — | 2.0 |
| 1.5–2 | — | <1.5 | 2.0 |
| 1.5–2 | >3 | >3 | 1.2 |
| 1.5–2 | 1.5–3 | 1.5–3 | 1.7 |
| 1.5–2 | >3 | 1.5–3 | 1.4 |
| 1.5–2 | 1.5–3 | >3 | 1.4 |
| 2–3 | <1.5 | <1.5 | 2.3 |
| 2–3 | <1.5 | — | 2.2 |
| 2–3 | — | <1.5 | 2.2 |
| 2–3 | >3 | >3 | 1.4 |
| 2–3 | 1.5–3 | 1.5–3 | 1.9 |
| 2–3 | >3 | 1.5–3 | 1.6 |
| 2–3 | 1.5–3 | >3 | 1.6 |
| >3 | <1.5 | <1.5 | 2.5 |
| >3 | <1.5 | — | 2.4 |
| >3 | — | <1.5 | 2.4 |
| >3 | >3 | >3 | 1.6 |
| >3 | 1.5–3 | 1.5–3 | 2.1 |
| >3 | >3 | 1.5–3 | 1.8 |
| >3 | 1.5–3 | >3 | 1.8 |

Thus, there has been shown and described specific embodiments of this invention, further modifications and improvements will occur to those skilled in the art. Such modifications could include providing methods other than using a set of fuzzy rules to control the quantification of the increment factors or to use various other sources to determine the existing environmental travel conditions. All modifications retaining the basic underlying principles disclosed and claimed herein are within the scope of this invention.

What is claimed is:

1. A method for providing navigation guidance via a land vehicle comprising the steps of:

providing a navigation route planner having a road network database for planning a navigation route along a road network;

determining a current estimated position of the land vehicle;

communicating maneuver instructions to a driver of the land vehicle at a predetermined maneuver distance base value before the land vehicle reaches a required maneuver along a planned navigation route;

detecting and quantifying current environmental travel conditions for assisting a navigation apparatus in guiding the land vehicle along the planned navigation route;

adjusting at least one of maneuver instructions and navigation route planning based on the detected and quantified current environmental travel conditions; and wherein said detecting of the current environmental travel conditions includes detecting an ambient temperature, a speed of windshield wiper movement, time of day, an amount of light, humidity, a traffic congestion level, and distance between the land vehicle and any immediately preceding and trailing vehicles.

2. The method of claim 1 further including the steps of:

providing the road network database with information representing a number of lanes and a road type for each road within the road network and an angle at road intersections and a maneuver complexity for each possible maneuver within the road network;

forming at least a portion of the current environmental travel conditions using the road network database information corresponding to the planned navigation route;

combining the road network database information corresponding to the planned navigation route into a plurality of static factors, wherein each static factor corresponds to a maneuver on the planned navigation route; and adjusting each maneuver instruction based on a corresponding static factor.

3. The method of claim 2 further including the step of adjusting the maneuver distance base value based on the static factor.

4. The method of claim 2 further including the step of adjusting a content of the maneuver instruction communicated to the driver based on the static factor.

5. The method of claim 1 further including the steps of:

quantifying the detected current environmental travel conditions into a dynamic factor; and adjusting at least one of the maneuver instructions and the navigation route planning based on the dynamic factor.

6. The method of claim 5 further including the steps of:

performing the quantifying step prior to each required maneuver; and adjusting at least one of maneuver distance base value and a content of the maneuver instruction communicated to the driver based on the dynamic factor.

7. The method of claim 5 further including the steps of:

creating a plurality of sets of weather profiles representing each road within the road network database wherein each weather profile set corresponds to a possible current environmental travel condition; and planning a navigation route based at least partially on a weather profile set corresponding to the detected current environmental travel conditions.

8. A method for providing navigation guidance via a land vehicle comprising the steps of:

providing a navigation route planner having a road network database for planning a navigation route along a road network;

determining a current estimated position of the land vehicle;

communicating maneuver instructions to a driver of the land vehicle at a predetermined maneuver distance base value before the land vehicle reaches a required maneuver along a planned navigation route;

quantifying information from the road network database into a plurality of static factors, wherein each static factor is formed from at least one of maneuver type factors and road attribute factors, wherein each maneuver type factor and road attribute factor corresponds to a maneuver on the planned navigation route;

detecting and quantifying environmental information into a dynamic factor, wherein the dynamic factor is formed from at least one of a traffic pattern factor and a weather condition factor including information representing an ambient temperature, a speed of windshield wiper movement, a time of day, and an amount of light;

combining the dynamic factor and a static factor corresponding to each required maneuver into an integrated distance increment factor; and adjusting the maneuver distance base value for each maneuver based on the integrated distance increment factor.

9. In the method of claim 8, the step of quantifying the static factors further includes the step of at least partially quantifying the static factors based on information representing a number of lanes and a road type for each road on the planned navigation route.

10. In the method of claim 8, the step of quantifying the static factors further includes the step of at least partially quantifying the static factors based on information representing an angle at an intersection and a maneuver complexity for each maneuver on the planned navigation route.

11. In the method of claim 8, the step of detecting and quantifying the dynamic factor at least partially includes the step of detecting and quantifying information representing a traffic congestion level and a distance between the land vehicle and any immediately preceding and trailing vehicles.

12. In the method of claim 8, the step of detecting and quantifying the dynamic factor includes updating the dynamic factor while approaching each required maneuver on the planned navigation route.

13. A land vehicle navigation apparatus comprising:

a navigation computer including a route planner having a road network data base for planning a navigation route along the road network;

a current position determining device operably coupled to the navigation computer for determining an estimated current position of the land vehicle;

a maneuver instruction communication device operably coupled to the navigation computer and the current position determining device for communicating maneuver instructions to a driver of the land vehicle to guide the driver along the planned route; and sensors operably coupled to the navigation computer for sensing current environmental travel conditions for assisting the navigation apparatus in guiding the driver along the planned route, wherein the sensors include sensors for sensing an ambient temperature, a speed of windshield wiper movement, time of day, an amount of light, humidity, a ratio of land vehicle speed to a speed limit, and a distance between the land vehicle and an immediately preceding vehicle.

14. The apparatus of claim 13 wherein the maneuver instruction communication device includes at least one of a visual display and an audio output device.

15. The apparatus of claim 14 wherein the navigation computer includes means to adjust at least one of a content and a timing of the maneuver instructions communicated to the driver based on the sensed current environmental travel conditions.

16. The apparatus of claim 13 wherein the route planner includes means for planning the navigation route based at least partially on the sensed current environmental travel conditions.

* * * * *